US012768637B2

(12) United States Patent
Enzinna

(10) Patent No.: US 12,768,637 B2
(45) Date of Patent: Oct. 20, 2026

(54) ENHANCED CAPACITANCE SENSING SYSTEM FOR ELECTROSTATIC CHUCK DEVICES

(71) Applicant: Advanced Energy Industries, Inc., Denver, CO (US)

(72) Inventor: Donald J. Enzinna, Lockport, NY (US)

(73) Assignee: Advanced Energy Industries, Inc., Denver, CO (US)

( * ) Notice: Subject to any disclaimer, the term of this patent is extended or adjusted under 35 U.S.C. 154(b) by 44 days.

(21) Appl. No.: 18/487,105

(22) Filed: Oct. 15, 2023

(65) Prior Publication Data

US 2025/0123091 A1 Apr. 17, 2025

(51) Int. Cl.
*G01B 7/28* (2006.01)

(52) U.S. Cl.
CPC .................................... *G01B 7/28* (2013.01)

(58) Field of Classification Search
CPC ........................................................ G01B 7/28
See application file for complete search history.

(56) References Cited

U.S. PATENT DOCUMENTS

| | | | | |
|---|---|---|---|---|
| 5,872,694 A | 2/1999 | Hoinkis et al. | | |
| 2010/0182036 A1* | 7/2010 | Regan | H01L 21/6831 | 324/123 R |
| 2013/0284709 A1* | 10/2013 | Makhratchev | B23K 10/00 | 29/874 |
| 2018/0131293 A1 | 5/2018 | Wang et al. | | |
| 2020/0411356 A1* | 12/2020 | Fujii | H02N 13/00 | |
| 2022/0216080 A1* | 7/2022 | Match | H01L 22/14 | |
| 2022/0334160 A1* | 10/2022 | Enzinna | G01R 33/02 | |
| 2024/0125832 A1 | 4/2024 | Enzinna | | |

FOREIGN PATENT DOCUMENTS

| | | | |
|---|---|---|---|
| FR | 3002082 A1 * | 8/2014 | C23C 16/4586 |
| WO | 2021185939 A1 | 9/2021 | |

OTHER PUBLICATIONS

PCT, International Search Report and Written Opinion issued in PCT/US2024/049421, Nov. 29, 2024, 13 pages.

* cited by examiner

*Primary Examiner* — Akm Zakaria
(74) *Attorney, Agent, or Firm* — NOD Law PC

(57) ABSTRACT

An electrostatic chuck system and method for determining workpiece bow are disclosed. The system includes a power supply configured to generate high DC voltages for chucking forces and low AC voltages for capacitance sensing. A multi-segmented chuck is driven by multiple outputs of the power supply. A capacitance monitor incorporated in the power supply measures load capacitance by sensing current due to the low AC voltages modulated on the high DC voltage. Capacitance is measured for one or more segments at a time with the low AC voltage portion of the signal inverted to the segments being measured. Measurements on inverted signals are performed until all segments have been measured and then a spread in the measured currents is used to assess wafer bow.

19 Claims, 6 Drawing Sheets

ENHANCED CAPACITANCE SENSING SYSTEM FOR ELECTROSTATIC CHUCK DEVICES

FIELD OF THE DISCLOSURE

The present disclosure relates generally to wafer processing. In particular, but not by way of limitation, the present disclosure relates to systems, methods and apparatuses for monitoring electrostatic chuck systems.

DESCRIPTION OF RELATED ART

In semiconductor manufacturing, electrostatic chucks (ESC), using high voltage to generate an attractive force between the chuck and the workpiece, have often been used to secure substrates within a processing chamber. These systems employ the principle of electrostatic attraction, where a high voltage is applied to generate an attractive force between the chuck and the workpiece. An electrostatic chuck consists of a platen with surface electrodes which are biased with high voltage to set up an electrostatic force between the platen and the wafer.

Two types of electrostatic chucks are available: the Coulomb and Johnsen-Rahbek (J-R) types. These are distinguished by their dielectric characteristics and, therefore, the way the clamping force is generated. A Coulomb chuck functions like a conventional dielectric capacitor. The J-R type has a large but finite resistance, so current flows through it and the substrate when the surfaces are in close contact and voltage is applied. Charge accumulates at the interface between substrate and dielectric which provides the clamping force.

In addition, different configurations of electrodes (or poles) on the chuck are used to get different characteristics. Monopolar, bipolar (two poles) and multipolar chucks (including 6 phase hexapolar types) are available depending on the application, and use of multiple electrodes (clamping regions) allows more uniform clamping force across the wafer.

The quality of the clamping force and the presence of the workpiece are often determined through capacitance sensing. Capacitance sensing involves the measurement of changes in capacitance, typically achieved by introducing a small alternating current (AC) waveform into the high voltage output of the chucking power supply. The current resulting from this AC waveform is then sensed and used to determine the capacitance. This method allows for the detection of changes in the workpiece's position or presence on the chuck.

E-Chuck power supplies are known to incorporate capacitance monitors for measuring load capacitance. These power supplies often use amplifiers to drive the chuck, as amplifiers can readily generate the combination of high direct current (DC) voltages for chucking forces and low AC voltages for capacitance sensing. Some of these power supplies are designed to have multiple outputs for driving multi-segmented chucks, such as hexapolar chucks.

Another aspect of wafer analysis involves the assessment of wafer bow. Wafer bow refers to the curvature of a wafer, which can affect the wafer's mechanical stability and the uniformity of the devices fabricated on the wafer. Wafer bow can be influenced by various factors, including the wafer material and the manufacturing process. This can be particularly relevant with newer wafer materials, such as silicon carbide, which may exhibit higher amounts of bow. The bow of a wafer can cause issues during processing, and thus, it is beneficial to be able to measure and monitor the bow of a wafer.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Capacitance readings can provide valuable information about the workpiece. For instance, in the context of semiconductor wafers, multiple capacitance readings can be used to estimate the wafer to chuck distance at different locations. This can provide insights into the wafer's physical characteristics, such as its bow or curvature. Inverting one of the multiple channels in a chucking system and measuring the capacitance across all channels can be performed for each of the multiple channels. In the end, a spread of these capacitance measurements across all measurements taken, or a standard deviation thereof, can be used as a proxy for wafer bow. Wafer bow refers to the curvature of the wafer, which can affect the evenness of the clamping.

In multi-segmented chucks, when all channels have the capacitance sense signal turned on, the total capacitance to ground is measured as a fraction across all channels. The capacitance between chuck phases cannot be measured as both sides of the capacitor are exposed to the same AC signal, resulting in no net voltage change across the capacitance. However, each channel can independently invert the capacitance sense signal, effectively doubling the net voltage change across any capacitance between the inverted phase and the others.

In general, in a first aspect, the system features an electrostatic chuck system that uses capacitance sensing to determine if a workpiece is in place or clamped and the quality of the clamp. This system incorporates capacitance monitors to measure load capacitance and uses amplifiers to generate the combination of high DC voltages for chucking forces and low AC voltages for capacitance sensing.

The system may include multiple outputs to drive multi-segmented chucks, for instance hexapolar chucks. Capacitance is measured by sensing current due to a small AC waveform fed into the high voltage output of the power supply. When all six channels have the capacitance sense signal turned on, a fraction of the total capacitance to ground is measured by the system.

Each channel may have the capacitance sense signal inverted independent of the others, and measurements can be taken as the inverted phase is moved around to each channel. When the capacitance sense signal is inverted, the net voltage change across any capacitance between the inverted phase and the others is effectively doubled. The system measures six capacitances which represent six different areas of the wafer and looks for a wide difference between samples as an indicator of wafer bow.

Six capacitance readings are taken by the system, with one of the six channels inverted. The total wafer capacitance is computed as the sum of these six readings. The wafer bow is based on the six readings (e.g., based on a spread of the six readings, which may be determined, for instance, via a standard deviation).

Until now, capacitance sensing was a scalar. By taking more than one reading, the system can get an estimate of the wafer to chuck distance in more than one place.

In some aspects, the techniques described herein relate to a power supply, including: multiple outputs; one or more power sources (e.g., high voltage) configured to generate DC voltages at the multiple outputs for chucking forces; an AC signal injector for each of the multiple outputs and configured to generate a AC signal (e.g., a smaller signal modulated on the DC voltages) for capacitance sensing; and a current monitor for each one of the multiple outputs configured to determine capacitances in a multi-segmented electrostatic chuck by measuring current from a corresponding one of the AC signal injectors, wherein the AC signal is inverted to a first one or more of the multiple outputs and then inverted to a second one or more of the multiple outputs.

In some aspects, the techniques described herein relate to a method of determining workpiece bow in an electrostatic chuck system, the method including: generating high voltages for chucking forces and AC voltages for capacitance sensing using a power supply; driving a multi-segmented chuck using multiple outputs of the power supply; inverting the AC voltage to each of the outputs at different times; for each inverted signal, measuring a corresponding current, wherein capacitance between the multi-segmented chuck and the workpiece is based on current measured at the segment seeing the inverted signal; and determining workpiece bow based on the measured currents (e.g., based on a spread of current measurements, which may be determined, for instance, via a standard deviation).

In some aspects, the techniques described herein relate to a non-transitory tangible processor readable medium, including instructions that when executed by a processor, cause the processor to: cause generation of a DC signal modulated with an AC signal (the AC signal having substantially smaller amplitude than the DC signal); drive a multi-segmented chuck with the DC signal modulated with the AC signal; invert the AC signal to a first segment of the multi-segmented chuck; sense a first chuck-to-workpiece capacitance by measuring a first AC current to the first segment seeing the inverted AC signal; invert the low voltage AC signal to a second segment of the multi-segmented chuck; sense a second chuck-to-workpiece capacitance by measuring a second AC current to the second segment seeing the inverted AC signal; and determine workpiece bow based the first and second chuck-to-workpiece capacitances (e.g., based on a spread of the first and second chuck-to-workpiece capacitances, which may be determined, for instance, via a standard deviation).

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
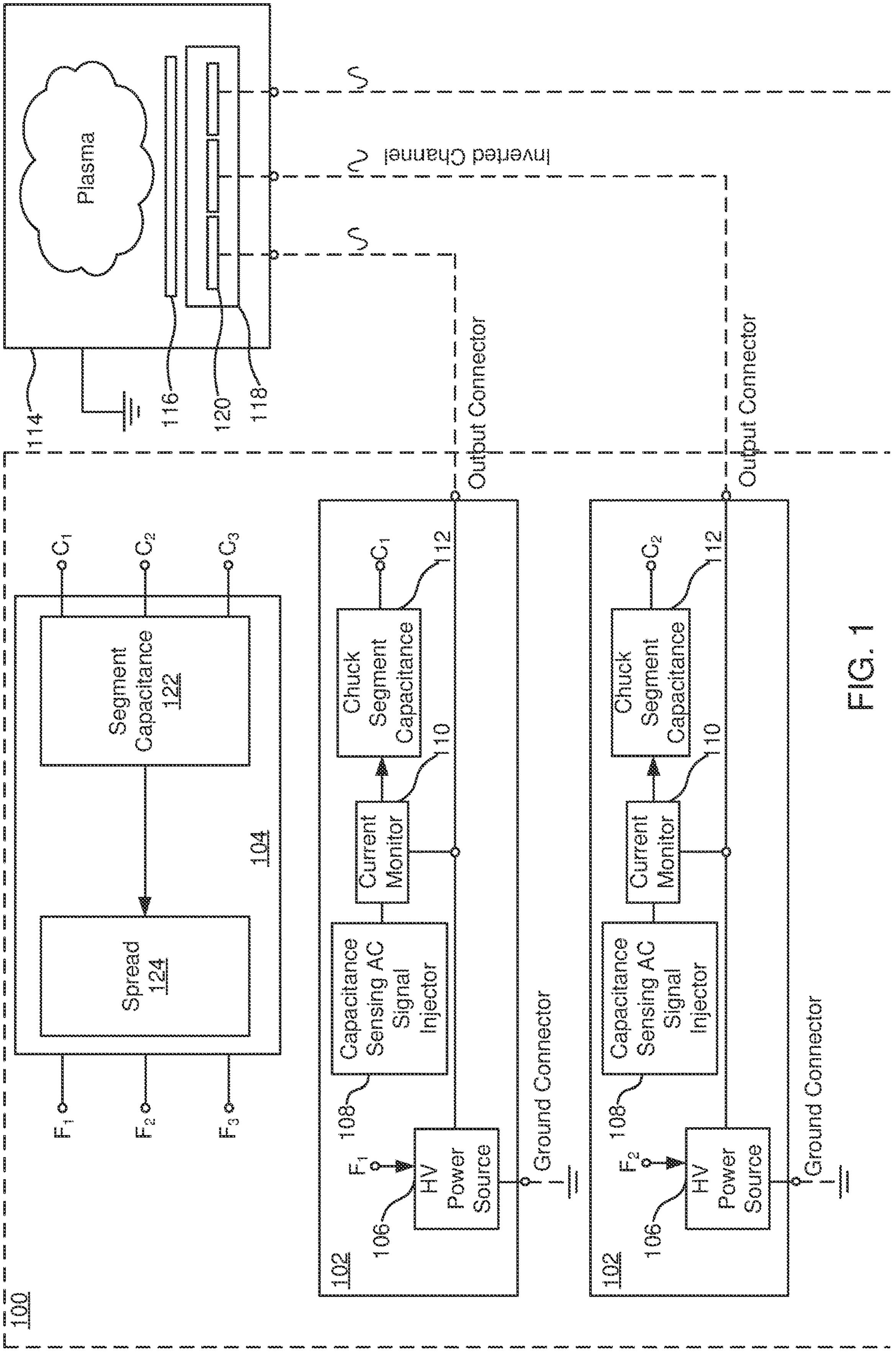
FIG. 1 illustrates an embodiment of a multi-output power supply for use with a multi-segmented chuck.

Prior to describing the embodiments in detail, it is expedient to define terms as used in this document.

The word "exemplary" is used herein to mean "serving as an example, instance, or illustration." Any embodiment described herein as "exemplary" is not necessarily to be construed as preferred or advantageous over other embodiments.

For the purposes of this disclosure, a high DC voltage is one having a frequency up to 100 Hz.

The flowcharts and block diagrams in the following Figures illustrate the architecture, functionality, and operation of possible implementations of systems, methods and computer program products according to various embodiments of the present disclosure. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It will be understood that, although the terms first, second, third etc. may be used herein to describe various elements, components, regions, and/or segments, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Electrostatic chuck systems are designed to hold a workpiece in place during various manufacturing processes. These systems utilize the principle of electrostatic attraction, where a voltage is applied to an electrode, creating an electric field that attracts the workpiece to the chuck. The workpiece, often a semiconductor wafer, is thus held in place by the electrostatic force generated between the chuck and the workpiece.

One of the features of these electrostatic chuck systems is their use of capacitance sensing. Capacitance, in this context, refers to the ability of the system to store an electric charge. The capacitance sensing feature is used to determine if a workpiece is in place or clamped and to assess the quality of the clamp. This is achieved by measuring the change in capacitance when a workpiece is placed on the chuck. A change in capacitance indicates that the workpiece is in place and clamped. The magnitude of this change can provide information about the quality of the clamp, such as whether the workpiece is evenly clamped or if there are areas where the workpiece is not in full contact with the chuck.

Capacitance sensing in electrostatic chuck systems can be a dynamic process. The system continuously monitors the capacitance during wafer processing. This allows the system to detect any changes in the clamping of the workpiece, such as if the workpiece becomes unclamped or if the quality of the clamp changes. This continuous monitoring of the capacitance provides real-time feedback about the clamping status of the workpiece, enabling immediate corrective actions if any issues are detected.

E-Chuck power supplies are designed to generate the electrical power that is used by the electrostatic chuck to hold the workpiece in place. The E-Chuck power supplies are typically equipped with amplifiers or high and low voltage power sources, which are used to generate the combination of high DC voltages and low capacitive sensing AC signals that are used in the electrostatic chuck system. When a high DC voltage is applied to electrode in the E-Chuck, an electric field is generated between the electrode and the workpiece (e.g., a silicon wafer) thereby attracting the workpiece to the chuck. The strength of this electrostatic force, and thus the clamping force exerted on the workpiece, can be controlled by adjusting the magnitude of the DC voltage. This allows the system to adapt to different workpieces and manufacturing processes, providing a versatile and flexible clamping solution.

At the same time, the low amplitude AC signal generated by an E-Chuck power supply is used for capacitance sensing. When a small AC waveform is modulated on the high voltage DC output of the power supply, current flows between the chuck and ground through the workpiece—the interface between the chuck and the workpiece acting as a capacitor to pass the low amplitude AC signal. By sensing the current that flows to the workpiece, the system can measure the capacitance between the E-Chuck and the workpiece and thus determine if the workpiece is in place and clamped, and assess the quality of the electrostatic clamping. The use of a low amplitude AC signal for capacitance sensing allows for a sensitive and accurate measurement, providing valuable feedback about the clamping status of the workpiece.

Recent advancements in E-Chuck power supplies have led to the development of models that feature multiple outputs. These outputs are designed to drive multi-segmented chucks, which are often hexapolar in nature. Hexapolar chucks, as the name suggests, are divided into six segments or phases. Each segment in a multi-segmented chuck can be independently controlled, allowing for a more precise and flexible clamping of the workpiece. For purposes of this disclosure, E-Chucks and their power supplies will include three or more segments, and in some cases an even number of segments greater than three. The segments can take a variety of shapes, including, but not limited to, radial and concentric.

The multiple outputs of the E-Chuck power supply drive the different segments of the multi-segment chuck such that each segment receives an independent signal. Each output can generate a separate signal (or channel), which can be applied to its corresponding chuck segment. This allows for the independent control of the electrostatic force exerted by the different segments of the multi-segment chuck. For instance, if a workpiece is not evenly clamped, the system can adjust the applied DC signal to the different segments to improve the clamping force distribution. This feature enhances the adaptability of the system to different workpieces and manufacturing processes as well as allowing real-time adjustments to a wafer without breaking the processing chamber vacuum.

At the same time, the multiple outputs of the E-Chuck power supply also enable a more nuanced capacitance sensing. Unlike a single channel E-Chuck, when the capacitance sense signal is turned on for all channels (segments) of a multi-segmented E-Chuck, all channels should see the same current and hence the same capacitance—that is, unless the wafer is bowed or there is uneven clamping (i.e., a distance between the workpiece and chuck is not consistent across the whole workpiece). If there discrepancies between segments/channels, differences in the sensed currents can be observed, and thus, capacitance sensing can provide localized analysis of wafer bow and clamping quality.

What is more, if one or more of the channels is inverted, then current can flow between the inverted channel and the non-inverted adjacent channels via the workpiece, and the signal for the inverted channel is effectively doubled compared to the situation where an in-phase signal is provided to all channels. This greater signal-to-noise ratio allows even more nuanced analysis of wafer bow and clamping quality enabling more effective corrective actions to be taken to improve the clamping quality or even discard a wafer that is excessively bowed.

In particular, when the capacitance sense signal is turned on for all channels of the E-Chuck power supply, the system measures a fraction of the total capacitance to ground for every channel. This is because the capacitance between the chuck and the workpiece is distributed across the different segments of the multi-segmented electrostatic chuck, and thus across the different channels of the power supply. Each channel measures the capacitance related to its corresponding chuck segment, providing a fraction of the total capacitance to ground.

However, when the capacitance sense signal is inverted to one or more of the segments/channels, a first capacitance measurement can be taken for the inverted channel(s) with greater sensitivity. The capacitance sense signal can then be inverted for another one or more of the segments/channels and a second capacitance measurement can be taken for the inverted channel(s). This pattern of invert and measure can be repeated until all segments/channels have been measured with the inverted low voltage AC signal. In an ideal clamping situation, all capacitance measurements will be the same-indicating that the gap between the multi-segmented electrostatic chuck and the substrate is the same at all measurable positions. However, in practice, the multiple measurements will likely see some spread (e.g., measured via standard deviation). If the spread or standard deviation of the capacitance measurements exceeds a threshold, then the system may have identified a bowed wafer or poor clamping. Further, the source of the issue (i.e., the one of the segments) can be identified and corrective action taken relative to the identified segment. For instance, the high voltage DC chucking voltage can be adjusted to certain ones of the segments/channels in order to apply more or less clamping force to chuck segments that show capacitance that deviates from the capacitances of the other segments. Each time all segments/channels have been measured can be referred to as a "cycle." In some cases the spread or standard deviation can be calculated for each cycle. In other cases, the spread or standard deviation can be calculated over a previous X number of measurements that may include more or fewer measurements than seen in a single cycle.

In one example where a hexapolar chuck is used, the AC signal can be inverted in one of the six segments at a first time, a first capacitance measurement taken on the inverted channel, then inverted in a second segment at a second time, and a second capacitance measurement taken on the second inverted channel. This process can continue until six measurements have been taken, one for each channel and each channel seeing the inverted signal, at which point the cycle can repeat. Wafer bow can be based on these measurements (e.g., on a cycle of measurements). A spread of the six capacitance values (or measured currents) can be determined, which is a proxy for wafer bow (i.e., the workpiece bow is proportional to the spread of the capacitances).

In the context of electrostatic chuck systems, the evolution of capacitance sensing has led to a more detailed and accurate assessment of the clamping status of the workpiece. Previously, capacitance sensing was a scalar process, where a single reading was taken to measure the capacitance. This single reading provided an overall measure of the clamping status of the workpiece, but it did not provide information about the distribution of the clamping force across different areas of the workpiece.

However, with the advent of multi-segmented electrostatic chucks and electrostatic chuck power supplies with multiple outputs, it has become possible to take more than one capacitance reading. By taking multiple readings, the system can measure the capacitance related to different areas of the workpiece. Each reading corresponds to a different segment of the chuck, and thus provides information about the clamping status of its corresponding area of the workpiece. This provides a more detailed and spatial picture of the clamping status of the workpiece, as it allows the system to detect areas where the workpiece is not in full contact with the chuck. By inverting one or more channels for a given capacitance measurement, and looking at current to the inverted channel(s), the sensitivity of these measurements can be increased.

Therefore, the evolution from scalar capacitance sensing to taking multiple readings, and inverting one or more channels, represents a notable advancement in the field of electrostatic chuck systems. It enhances the sensitivity and accuracy of the capacitance measurement, providing a more detailed and accurate assessment of the clamping status of the workpiece. This contributes to the overall efficiency and effectiveness of the manufacturing process, ensuring that the workpiece is securely and evenly held in place.

FIG. 1 illustrates an embodiment of a multi-output power supply for use with a multi-segmented E-Chuck. The power supply 100 includes three sources 102 (only two are visible), three outputs, and a controller 104. The sources 102 each comprise a power source 106 (e.g., high voltage such as 500 V, 1000 V, 5000 V) that provides a DC signal to corresponding output connectors, which can be coupled to a processing chamber 114, and more specifically to a corresponding segment 120 (channel or electrode) of a multi-segmented chuck 118. The DC signal creates an electrostatic attraction between the multi-segmented chuck 118 and the workpiece 116, but does not cause current flow into the workpiece. The illustrated embodiment has three sources 102 and three segments 120. Each source 102 can also provide an AC signal modulated on the DC signal for use in capacitance sensing. The AC signal has a substantially lower magnitude than the DC signal. The AC signal, or capacitance sense signal, can be generated by a capacitance sensing AC signal injector 108 ("AC signal injector"), which couples to the output line at or before the output connector. A current monitor 110 can be configured to sense the current provided by the capacitance sensing AC signal injector 108, which is proportional to the capacitance at the chuck-to-workpiece interface. Optionally, a chuck segment capacitance 112 can convert the sensed AC current to a capacitance value. Either the capacitance value or the raw current measurement is passed to the controller 104 by way of a segment capacitance 122. The capacitance value, or the underlying current, can be stored on the source 102 or on the controller 104.

The capacitance sense signal can be inverted for one or more of the channels at a time (in the illustrated example the middle channel is inverted). Although the capacitance sense signal can be measured on all three channels, it will be the largest, and thus have the highest signal-to-noise ratio, on the inverted channel. In an embodiment, the capacitance sensing measurement may be stored for the inverted channel whether or not measurements for the other channels are stored. Another of the three channels can then be inverted and a capacitance measurement can be taken for that inverted channel. Finally, the remaining channel can be measured with the inverted signal. At this point, a cycle has been completed, and the capacitance values, C1, C2, C3, have been or can be provided to the controller 104, and more specifically to the segment capacitance 122. A spread module 124 can calculate a spread (e.g., via a standard deviation) in the three capacitance measurements and compared to a threshold. If excessive spread is calculated, then the controller 104 identifies wafer bow or poor chucking and can identify which of the segments 120, and hence which region of the workpiece 116, corresponds to the excessive wafer bow or poor chucking. Optionally, the controller 104 can then send instructions to the sources 102 via one or more of feedback signals $F_1$, $F_2$, $F_3$ to adjust the high voltage DC signal to one or more of the regions 120. Measurement cycles and this feedback can repeat to provide real time optimization of wafer chucking throughout processing.

Figure 2:
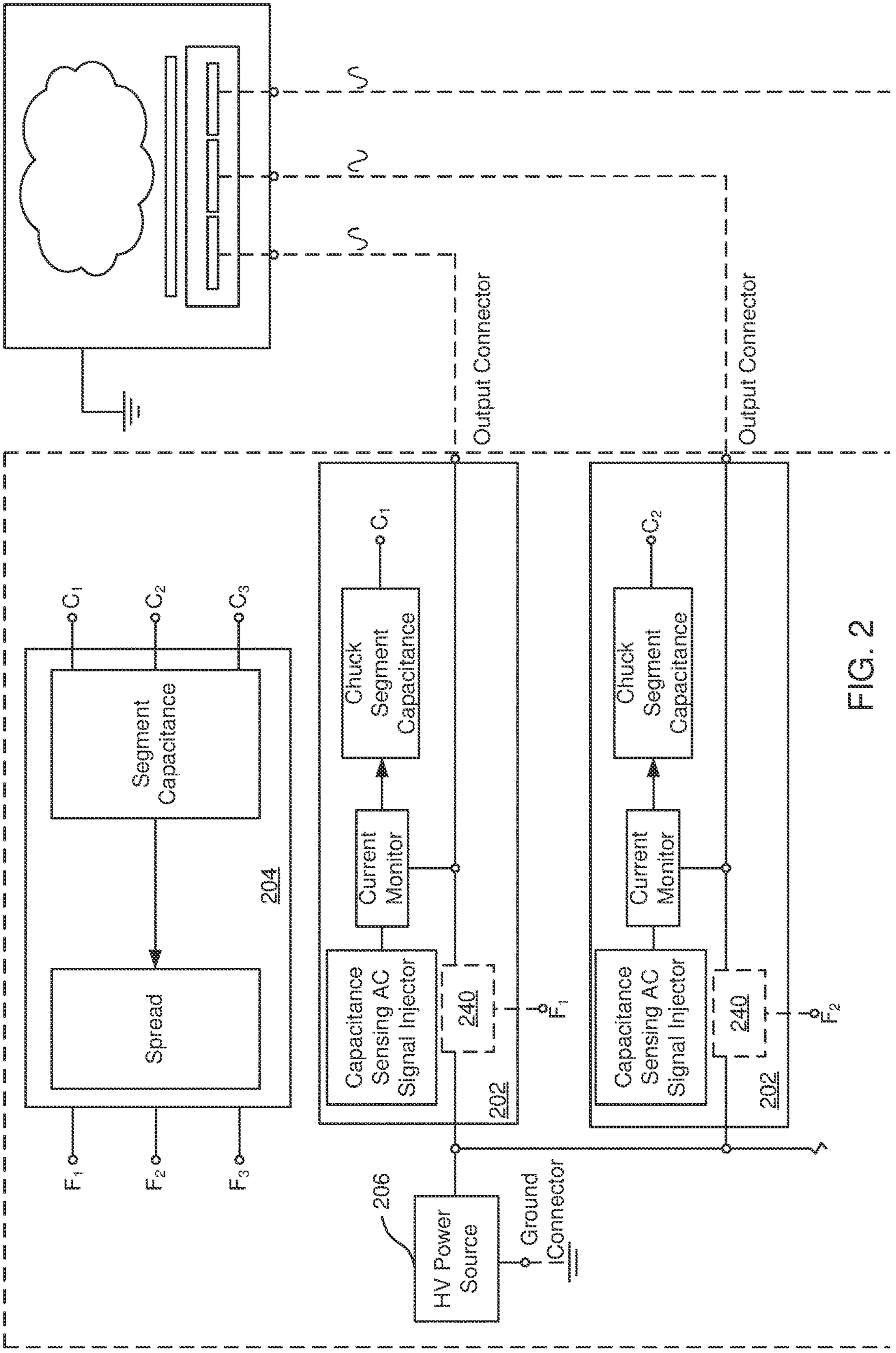
FIG. 2 illustrates an alternative embodiment of a multi-output power supply having a single high voltage power supply.

In the embodiment shown in FIG. 1, each source 102 has its own power source 106 (e.g., high voltage such as 500 V, 1000 V, 5000 V), but this is in no way limiting, and in other embodiments, a single power source 206 can supply power to two or more of the sources 202 as shown in FIG. 2. Because the sources 202 do not have their own power sources, each can optionally include a regulator 240 configured to receive a feedback signal, $F_1$, $F_2$, $F_3$ or control from the controller 204 and correspondingly produce a regulated output as the DC baseline to be modulated by the capacitance sensing AC signal. All other aspects of FIG. 2 have already been described relative to FIG. 1.

Furthermore, while both FIGS. 1 and 2 show separate power sources and AC signal injectors, in other embodiments, these functions can be combined. For instance, an amplifier is one device that can be used to provide a high voltage DC signal with a low AC signal modulated thereon (i.e., a low voltage AC signal at a high voltage DC bias). Although FIGS. 1 and 2 show three outputs, in other embodiments the methods and systems herein disclosed can easily be applied to power supplies having three or more outputs and a multi-segmented chuck having a corresponding number of segments.

Figure 3:
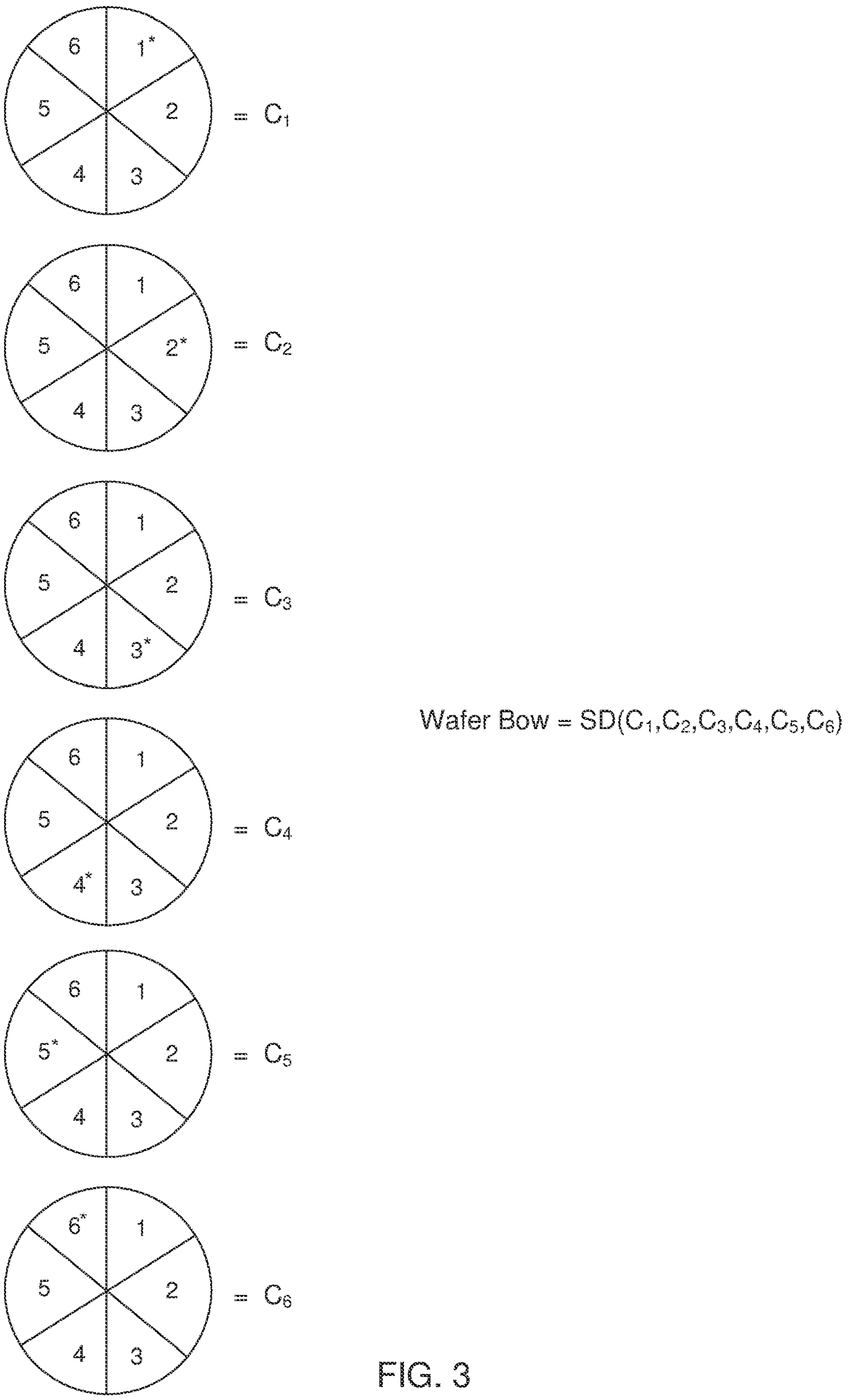
FIG. 3 illustrates measurements of a hexapolar system used to determine wafer bow or localized chucking effect.

FIG. 3 illustrates a cycle of capacitance measurements to determine wafer or workpiece bow or localized chucking quality. A hexapolar chuck is shown, where an "*" identifies the segments/channel receiving the inverted low amplitude AC signal, and being measured for capacitance. A standard deviation or other measure of spread is taken on the six measurements of capacitance. If excessive deviation is found, the system can identify that segment/channel being the most out of alignment with the other measurements as the one experiencing the most wafer bow, or the poorest localized wafer chucking. Although this diagram shows radially separated segments of the multi-segmented workpiece, in other embodiments, different segments shapes can be used, such as concentric segments.

Figure 4:
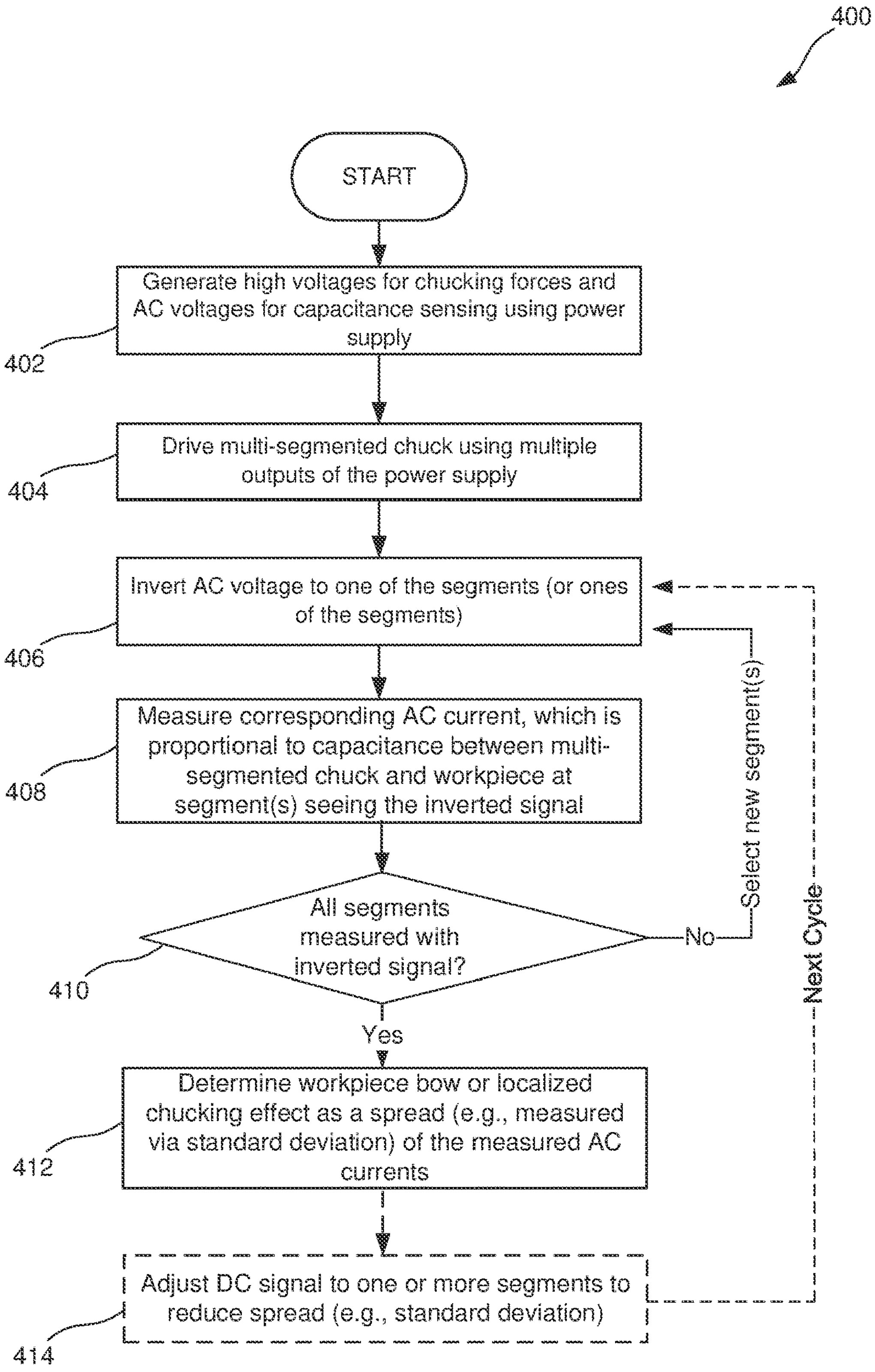
FIG. 4 illustrates a method of determining workpiece bow in an electrostatic chuck system.

FIG. 4 illustrates a method of determining workpiece bow in an electrostatic chuck system. The method 400 includes generating high voltages for chucking forces and low AC voltages for capacitance sensing using a power supply (Block 402). The method 400 further includes driving a multi-segmented chuck using multiple outputs of the power supply (Block 404). The method 400 yet further includes inverting the low AC voltage to one of the segments (or ones of the segments) (Block 406), and for each inverted signal, measuring a corresponding AC current, wherein capacitance between the multi-segmented chuck and the workpiece, at a segment seeing the inverted signal, is proportional to the current measured at the segment (Block 408 and Decision 410). The method 400 further determines workpiece bow or localized chucking effect as a spread or standard deviation of the measured currents for all of the outputs (Block 412). Once a cycle of measurements has completed, the method 400 can optionally adjust the high voltages applied to one or more of the segments/channels to see a reduction in the spread or standard deviation in a next cycle (Block 414). These cycles of measurements and feedback control can continue throughout processing to provide real time adjustments to wafer chucking to optimize coupling with the E-Chuck.

The method 400 can be applied to any multi-segmented chuck having three or more segments, and preferably four of more segments. In some embodiments, an even number of segments can be used and optionally the inverted signal can be passed to opposing segments of the chuck (i.e., on opposing sides when radial separation of segments is used).

Figure 5:
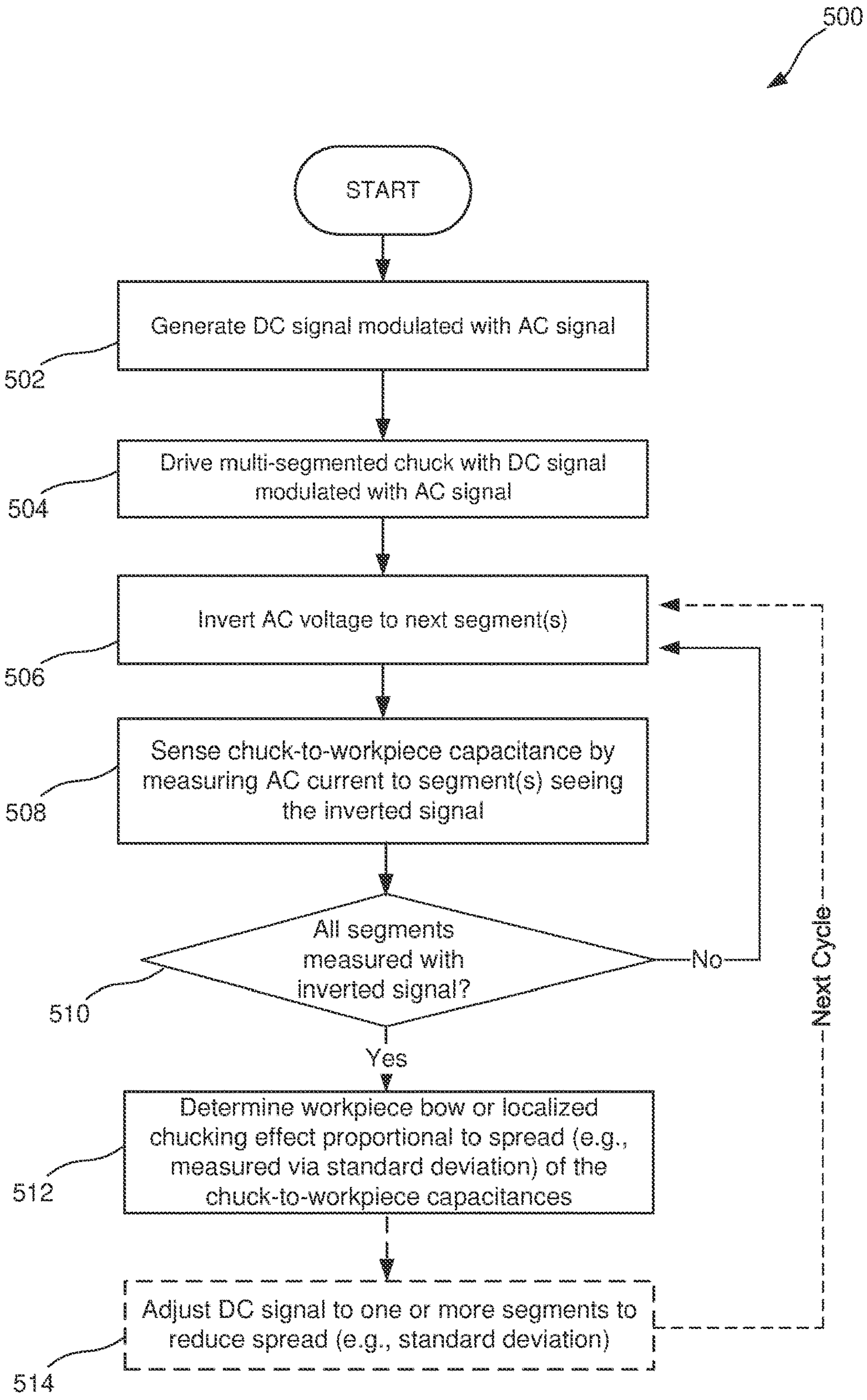
FIG. 5 illustrates a method of operating a multi-output power supply for a multi-segmented E-Chuck.

FIG. 5 illustrates a method of operating a power supply for a multi-segmented E-Chuck. The method 500 includes generating a high voltage DC signal modulated with a low voltage AC signal (Block 502). The method 500 further includes drive a multi-segmented chuck with the high voltage DC signal modulated with the low voltage AC signal (Block 504). The low voltage AC portion of the combined signal can then be inverted to a first of the segments (or first set of segments) of the multi-segmented E-Chuck (Block 506), and a first chuck-to-wafer capacitance can be sensed by measuring a first AC current to the first segment—the segment seeing combined signal with the inverted low voltage AC portion (Block 508). If less than all of the segments in the multi-segmented chuck have seen the inverted signal (Decision 510=No), then the method 500 circles back to inverting the low voltage AC portion of the combined signal to a next segment (or next set of segments) (Block 506) and capacitance can again be sensed via current into the segment seeing the inverted signal (Block 508). The inverted signal can be applied, and capacitance measurements taken, until all segments or groups of segments have seen the inverted signal (Decision 510=Yes). The method 500 then determines workpiece bow or localized chucking effect proportional to the spread or standard deviation of the chuck-to-workpiece capacitances (Block 512). Once a cycle of measurements has completed, the method 500 can optionally adjust the high voltages applied to one or more of the segments/channels to reduce the spread or standard deviation in a next cycle (Block 514). These cycles of measurements and feedback control can continue throughout processing to provide real time adjustments to wafer chucking to optimize coupling with the E-Chuck.

Alternative Embodiment 1

One alternative embodiment of the disclosure is an electrostatic chuck system, comprising a power supply, a capacitance monitor, and a chuck monitor. The power supply has multiple outputs coupled to and configured to drive high voltage to a multi-segmented chuck to cause electrostatic attraction between a workpiece and the multi-segmented chuck. The power supply is further configured to provide a low voltage AC signal to the multiple outputs, and is configured to invert the low voltage AC signal to a first of the outputs at a first time and to a second of the outputs at a second time. The capacitance monitor is configured to measure (1) a first current in a first current loop comprising the first of the outputs and two adjacent outputs to the first of the outputs at the first time, at substantially the first time, or at a time soon after the first time, and (2) a second current loop comprising the second of the two outputs and two adjacent outputs to the second of the outputs at the second time, substantially the second time, or at a time soon after the second time. In other words, the inverted signal is passed to a first set of the outputs, comprising one or more of the outputs, and current is sensed on a current loop comprising the inverted output, either when the signal is inverted, or soon after. This is a first measurement. Another of the low amplitude AC signals is then inverted and current is again sensed on that one or more outputs. These measurements can continue until all the outputs have seen the inverted signal and a corresponding current measurement has been taken. For instance, for a hexapolar chuck, six different inverted signals and corresponding current measurements could be made to complete a first measurement cycle. At the same time, two or three channels in the hexapolar chuck could be inverted at a given time and current measurements taken for each set of the inverted channels. In this case, current measurements are taken at three or two times, rather than six different times. In any event, once a measurement cycle is completed, a chuck monitor is configured to compare the measurements to assess wafer bow or localized quality of the electrostatic attraction. For instance, a standard deviation or spread of the measurements can be taken and if either exceeds a threshold, then the chuck monitor is deemed to have identified wafer bow or poor chucking. The high voltage may be altered to certain ones of the chuck segments in order to mitigate the wafer bow or improve equalization of wafer chucking across the workpiece. This cycle of measurement and adjustment to the high voltage signals can be periodic or ongoing and can be carried out without evacuating the processing chamber, thereby increasing throughput.

Alternative Embodiment 2

An electrostatic chuck system comprising a power supply, a multi-segmented chuck, and a capacitance monitor. The power supply is configured to generate high voltages for chucking forces and a low amplitude AC signal for capacitance sensing, the power supply having multiple outputs. The multi-segmented chuck is drive by the multiple outputs of the power supply. The capacitance monitor measures capacitances in the multi-segmented chuck by sensing current due to the low amplitude AC signal fed into the multiple outputs of the power supply, wherein the low amplitude AC signal is inverted to a first one or more segments in the multi-segmented chuck at a first time and two a second one or more segments in the multi-segmented chuck at a second time.

Figure 6:
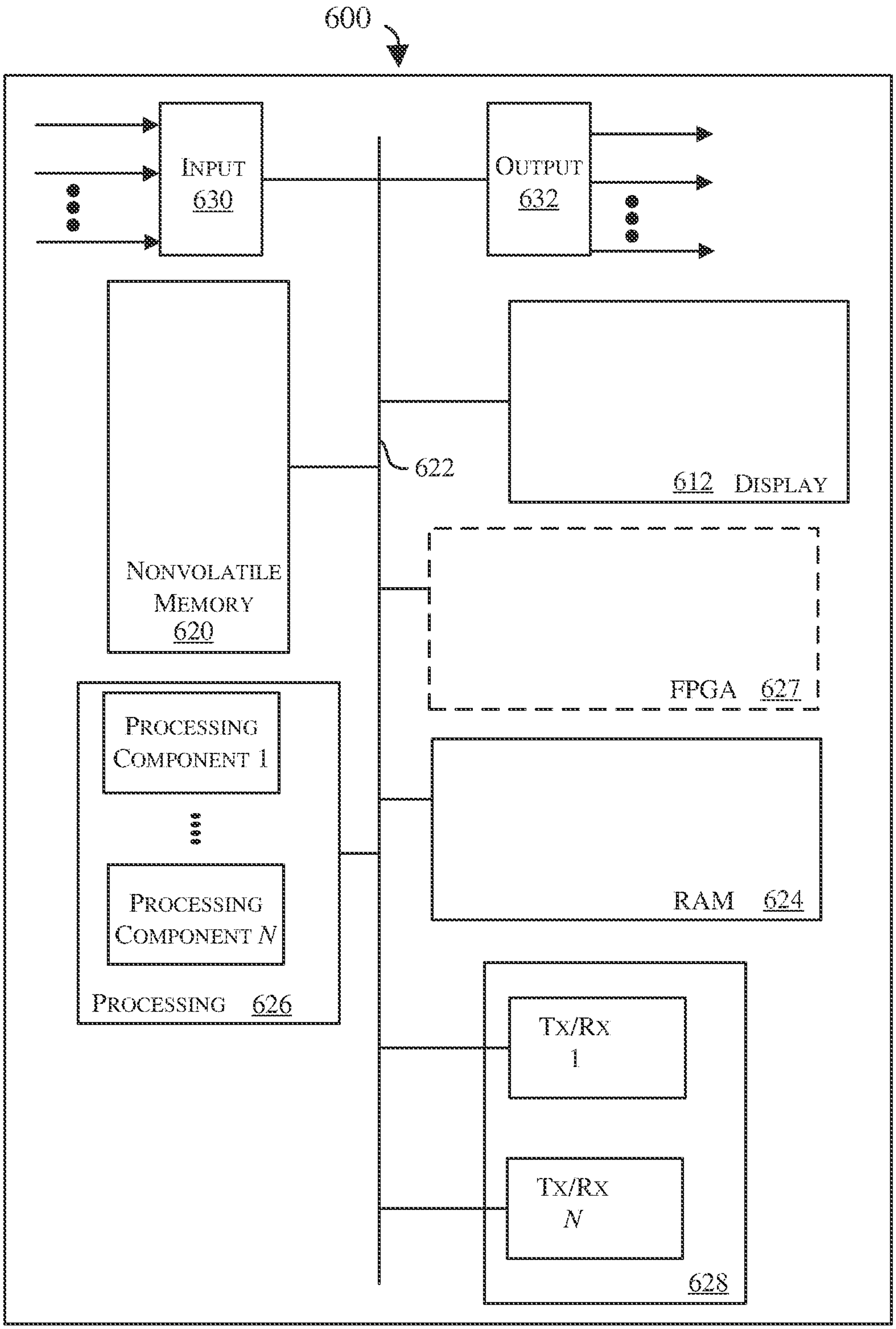
FIG. 6 is a block diagram depicting physical components that may be utilized to realize control of the inverted low voltage AC signals and feedback to the high voltage power sources.

The methods described in connection with the embodiments disclosed herein may be embodied directly in hardware, in processor-executable code encoded in a non-transitory tangible processor readable storage medium, or in a combination of the two. Referring to FIG. 6 for example, shown is a block diagram depicting physical components that may be utilized to realize the controller 104 (and any device or logic that identifies wafer bow and localized chucking effect based on capacitance measurements) according to an exemplary embodiment. As shown, in this embodiment a display portion 612 and nonvolatile memory 620 are coupled to a bus 622 that is also coupled to random access memory ("RAM") 624, a processing portion (which includes N processing components) 626, an optional field programmable gate array (FPGA) 627, and a transceiver component 628 that includes N transceivers. Although the components depicted in FIG. 6 represent physical components, FIG. 6 is not intended to be a detailed hardware diagram; thus many of the components depicted in FIG. 6 may be realized by common constructs or distributed among additional physical components. Moreover, it is contemplated that other existing and yet-to-be developed physical components and architectures may be utilized to implement the functional components described with reference to FIG. 6.

This display portion 612 generally operates to provide a user interface for a user, and in several implementations, the display is realized by a touchscreen display. In general, the nonvolatile memory 620 is non-transitory memory that functions to store (e.g., persistently store) data and processor-executable code (including executable code that is associated with effectuating the methods described herein). In some embodiments for example, the nonvolatile memory 620 includes bootloader code, operating system code, file system code, and non-transitory processor-executable code to facilitate the execution of a method described with reference to FIGS. 4 and 5 described further herein.

In many implementations, the nonvolatile memory 620 is realized by flash memory (e.g., NAND or ONENAND memory), but it is contemplated that other memory types may be utilized as well. Although it may be possible to execute the code from the nonvolatile memory 620, the executable code in the nonvolatile memory is typically loaded into RAM 624 and executed by one or more of the N processing components in the processing portion 626.

The N processing components in connection with RAM 624 generally operate to execute the instructions stored in nonvolatile memory 620 to enable identification of wafer bow or localized wafer chucking effect. For example, non-transitory, processor-executable code to effectuate the methods described with reference to FIGS. 4-5 may be persistently stored in nonvolatile memory 620 and executed by the N processing components in connection with RAM 624. As one of ordinarily skill in the art will appreciate, the processing portion 626 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 626 may be configured to effectuate one or more aspects of the methodologies described herein (e.g., the method described with reference to FIGS. 4-5). For example, non-transitory processor-readable instructions may be stored in the nonvolatile memory 620 or in RAM 624 and when executed on the processing portion 626, cause the processing portion 626 to perform identification of wafer bow or poor localized wafer chucking. Alternatively, non-transitory FPGA-configuration-instructions may be persistently stored in nonvolatile memory 620 and accessed by the processing portion 626 (e.g., during boot up) to configure the hardware-configurable portions of the processing portion 626 to effectuate the functions of the controller 104.

The input component 630 operates to receive signals (e.g., the current measurements from the current monitors or chuck segment capacitance) that are indicative of one or more aspects of the capacitance between the E-Chuck segments and the workpiece. The signals received at the input component may include, for example, a current measurement or capacitance calculation based on a current measurement. The output component generally operates to provide one or more analog or digital signals to effectuate an operational aspect of the feedback to the power sources. For example, the output portion 632 may provide the feedback signals $F_1$, $F_2$, and $F_3$ described with reference to FIG. 1.

The depicted transceiver component 628 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The terms and expressions employed herein are used as terms and expressions of description and not of limitation, and there is no intention, in the use of such terms and expressions, of excluding any equivalents of the features shown and described or portions thereof. Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms-even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, by way of example only, the disclosure of a "protrusion" should be understood to encompass disclosure of the act of "protruding"—whether explicitly discussed or not—and, conversely, were there only disclosure of the act of "protruding", such a disclosure should be understood to encompass disclosure of a "protrusion". Such changes and alternative terms are to be understood to be explicitly included in the description.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A power supply, comprising:

a first source configured to provide a first AC signal, the first source coupled to a first current monitor;

a second source configured to provide a second AC signal, the second source coupled to a second current monitor;

a third source configured to provide a third AC signal, the third source coupled to a third current monitor;

a controller configured to:

control the first source to provide an inverted AC signal while the second and third sources provide non-inverted AC signals;

control the second source to provide an inverted AC signal while the first and third sources provide non-inverted AC signals;

control the third source to provide an inverted AC signal while the first and second sources provide non-inverted AC signals; and determine a capacitance of a load coupled to the sources based upon current measurements from the first, second, and third current monitors.

2. The power supply of claim 1, comprising more than three sources.

3. The power supply of claim 2, wherein there are an even number of sources and wherein the AC signals are configured for coupling to segments of a multi-segmented electrostatic chuck.

4. The power supply of claim 1, wherein the controller is configured to identify workpiece bow localized to one or more segments of a multi-segmented electrostatic chuck, wherein the workpiece bow is proportional to a spread of capacitances.

5. The power supply of claim 4, wherein the controller is configured to adjust at least one of the one or more sources to reduce the spread.

6. The power supply of claim 1, wherein the AC signals comprise a frequency up to 100 Hz.

7. A method of determining workpiece bow in an electrostatic chuck system, the method comprising:

driving a multi-segmented chuck using AC voltages;

inverting each AC voltage at different times while other AC voltages are not inverted;

for each inverted AC voltage, measuring a corresponding current; and determining workpiece bow based upon the measured currents.

8. The method of claim 7, wherein there are three or more AC voltages and a corresponding number of segments in the multi-segmented chuck.

9. The method of claim 8, wherein there are an even number of AC voltages and an even number of segments in the multi-segmented chuck.

10. The method of claim 7, further comprising adjusting one or more of the AC voltages to reduce a spread of the measured currents for the outputs.

11. The method of claim 7, wherein the AC voltages have a frequency up to 100 Hz.

12. The method of claim 7, wherein the determining is based on a spread of the measured currents for the AC voltages.

13. A non-transitory tangible processor readable medium, comprising instructions that when executed by a processor, cause the processor to:

cause generation of a DC signal modulated with an AC signal;

drive all segments of a multi-segmented chuck with the DC signal modulated with the AC signal;

invert the AC signal to a first segment of the multi-segmented chuck while the AC signal is non-inverted to other segments;

sense a first chuck-to-workpiece capacitance by measuring a first AC current to the first segment seeing the inverted AC signal;

invert the AC signal to a second segment of the multi-segmented chuck while the AC signal is non-inverted to other segments;

sense a second chuck-to-workpiece capacitance by measuring a second AC current to the second segment seeing the inverted AC signal; and determine workpiece bow based on comparing the first and second chuck-to-workpiece capacitances.

14. The non-transitory tangible processor readable medium of claim 13, wherein the multi-segmented chuck has three or more segments.

15. The non-transitory tangible processor readable medium of claim 13, wherein the multi-segmented chuck is a hexapolar chuck.

16. The non-transitory tangible processor readable medium of claim 13, wherein determining the workpiece bow is based on a spread between three or more chuck-to-workpiece capacitances and wherein the multi-segmented chuck has at least three segments.

17. The non-transitory tangible processor readable medium of claim 16, wherein the multi-segmented chuck has an even number of segments.

18. The non-transitory tangible processor readable medium of claim 13, wherein the AC signal has a frequency up to 100 Hz.

19. The non-transitory tangible processor readable medium of claim 13, wherein the workpiece bow is proportional to a spread of the first and second chuck-to-workpiece capacitances.

* * * * *